Patented Oct. 7, 1952

2,613,141

UNITED STATES PATENT OFFICE 2,613,141

CHEMICAL BRIGHTENING OF ALUMINUM

William C. Cochran, Brussels, Belgium, assignor to Aluminum Company of America, Pittsburgh, Pa., a corporation of Pennsylvania No Drawing. Application July 29, 1949, Serial No. 107,645

5 Claims. (Cl. 41—42)

This invention relates to solutions and method for chemical brightening of aluminum. As used herein, the term "aluminum" includes pure aluminum, commercial aluminum containing the usual impurities, and aluminum base alloys.

According to my invention, aluminum articles may be readily brightened by simply immersing them for a short time in certain hot aqueous solutions containing phosphoric acid and hydrogen peroxide. In the past aluminum articles have usually been brightened by anodic treatment of the articles in one of several well known electrolytes. Electrolytic treatments require expensive electrical equipment, and also are not conveniently employed for treating small articles or a variety of different articles. Many efforts have been made to brighten aluminum articles in simple chemical solutions, but few such treatments have been successful, particularly for the production of surfaces of high specularity.

An object of this invention is to provide a convenient method for brightening aluminum articles. Another object is to provide a simple chemical solution and method for brightening aluminum articles, especially to produce surfaces of high specularity. These and other objects will be apparent in the following description of the invention.

The solutions that may be employed in accordance with the invention must comprise, as the essential components thereof, on a weight basis referred to the total weight of phosphoric acid, hydrogen peroxide and water therein, about 60 to 80 per cent phosphoric acid ($H_3PO_4$), about 1 to 10 per cent hydrogen peroxide and about 15 to 35 per cent water. The stated water content of the solutions just referred to, and also of those hereinafter referred to, is the entire water content thereof, whether added with the other components or separately. For optimum results such solutions comprising about 69 to 76 per cent phosphoric acid, about 3 to 6 per cent hydrogen peroxide and about 20 to 25 per cent water should be employed.

A solution consisting essentially of the three components specified above, within the limits stated, is very effective for brightening aluminum articles. However, a solution in which the components specified above constitute but a predominant part of the total is also contemplated. For some purposes, limited amounts of sulfuric acid may be added to the solution. Also aluminum in various forms may build up in the solution in noticeable amounts during use of the solution.

The composition of the solution and the temperature at which it is employed are very important. It is only when phosphoric acid and hydrogen peroxide are mixed in certain proportions, with an appropriate amount of water, that a brightening solution is produced. Further it is only when such a solution is employed at temperatures above about 70° C. that it is effective for improving the brightness and specularity of aluminum surfaces. To obtain the best results the solution used should be moderately agitated and maintained at a temperature between about 70 and 110° C. It is preferable to maintain the solution at a temperature within the upper portion of this range, but below 100° C., for example 90° C.

The period of immersion will vary with the type of aluminum being treated and the temperature of the solution; generally from about ¼ minute to 5 minutes is adequate. Shorter periods of time are often sufficient; longer periods of time do not appear to produce superior results. A single immersion in the solution is, of course, ordinarily sufficient.

Articles made of various types of aluminum may be treated in the solution with beneficial results. Finishes of high specularity are obtained on articles of high purity aluminum, 2S (commercially pure aluminum), 3S (a manganese containing alloy) and 52S (a magnesium containing alloy), for example.

The improved finish obtainable through use of my invention is exemplified in connection with the following solution:

| | Per cent by weight |
|---|---|
| Phosphoric acid | 75 |
| Hydrogen peroxide | 3.5 |
| Water | 21.5 |

A test panel of 2S aluminum (commercial aluminum with not more than 1 per cent of impurities) was merely solvent cleaned and then immersed in the above-mentioned solution at 90° C. for 3 minutes. The surface was found to have great brightness and specularity, readily apparent to the eye, but more accurately established by a quantitative measurement of luminous apparent reflectance obtained by use of a standard Hunter multipurpose reflectometer (described in the National Bureau of Standards Journal of Research, vol. 25, pages 581–618, November 1940). The luminous apparent reflectance measurement is found to be one of the best measures of the specularity of aluminum surfaces; low values indicate a high degree of specularity, and high values indicate a low degree of specularity. For the above-mentioned test panel, the luminous apparent reflectance value was .0273. This low luminous apparent reflectance value clearly reveals the very great effectiveness of the above-mentioned solution for producing brightened aluminum surfaces of high specularity. In fact, the specularity of surface of various groups of panels treated in accordance with the invention has been consistently improved by at least 60 per cent, as determined from luminous apparent reflectance measurements. Of course these improvements were readily apparent to the eye in each case (and usually markedly so), and the results were typical of many I have observed.

During use of the solutions described, various components may be volatilized or decomposed, but the solutions may be readily re-constituted by appropriate additions of components which have reached too low a concentration. Hydrogen peroxide additions, for example, must be made from time to time in order to replace amounts which are used up.

It will be understood that brightened aluminum surfaces produced in accordance with the invention may be suitably protected by lacquers, by the formation of oxide coatings thereon, or by other known finishing procedures, if desired.

I claim:

1. A method for chemical brightening of aluminum which comprises immersing an aluminum article in a solution consisting essentially of about 60 to 80 per cent phosphoric acid, about 1 to 10 per cent hydrogen peroxide and about 15 to 35 per cent water, referred to the total weight of the aforesaid components, the solution being maintained at a temperature above about 70° C.

2. A method for chemical brightening of aluminum which comprises immersing an aluminum article in a solution consisting essentially of about 69 to 76 per cent phosphoric acid, about 3 to 6 per cent hydrogen peroxide and about 20 to 25 per cent water, referred to the total weight of the aforesaid components, the solution being maintained at a temperature between about 70 and 110° C.

3. A method according to claim 1 wherein the article is immersed for a period of about ¼ to 5 minutes.

4. A method according to claim 2 wherein the article is immersed for a period of about ¼ to 5 minutes.

5. A method for chemical brightening of aluminum which comprises immersing an aluminum article for about 3 minutes in a solution consisting of about 75 per cent phosphoric acid, about 3.5 per cent hydrogen peroxide and about 21.5 per cent water, on a weight basis, the solution being maintained at a temperature of about 90° C.

WILLIAM C. COCHRAN.

REFERENCES CITED

The following references are of record in the file of this patent:

UNITED STATES PATENTS

| Number | Name | Date |
|---|---|---|
| 2,154,455 | Kepfer | Apr. 18, 1939 |
| 2,446,060 | Pray | July 27, 1948 |
| 2,502,621 | Fine | Apr. 4, 1950 |